United States Patent
Kuo

(10) Patent No.: US 8,643,629 B2
(45) Date of Patent: Feb. 4, 2014

(54) COLOR FILTER WITH TOUCH SCREEN FUNCTION AND LIQUID CRYSTAL DISPLAY DEVICE

(75) Inventor: Chien-Chung Kuo, Taichung County (TW)

(73) Assignee: Wintek Corporation, Taichung (TW)

( * ) Notice: Subject to any disclaimer, the term of this patent is extended or adjusted under 35 U.S.C. 154(b) by 733 days.

(21) Appl. No.: 12/395,207

(22) Filed: Feb. 27, 2009

(65) Prior Publication Data
US 2009/0213096 A1   Aug. 27, 2009

(30) Foreign Application Priority Data
Feb. 27, 2008   (TW) ................................ 97106728 A

(51) Int. Cl.
*G06F 3/042* (2006.01)

(52) U.S. Cl.
USPC ............... 345/176; 345/97; 345/88; 345/173; 349/39; 349/106; 349/107; 349/138; 349/155; 349/158; 349/143; 359/586

(58) Field of Classification Search
USPC ......... 345/173, 87, 88, 176; 359/586; 349/39, 349/106, 107, 138, 143, 155, 158
See application file for complete search history.

(56) References Cited

U.S. PATENT DOCUMENTS

| | | | |
|---|---|---|---|
| 4,632,514 A * | 12/1986 | Ogawa et al. ................. | 349/160 |
| 5,554,828 A * | 9/1996 | Primm ........................ | 178/19.06 |
| 5,579,036 A | 11/1996 | Yates | |
| 5,631,805 A | 5/1997 | Bonsall | |
| 6,549,193 B1 | 4/2003 | Huang et al. | |
| 6,618,107 B1 * | 9/2003 | Tanaka et al. ................. | 349/106 |
| 6,633,353 B1 | 10/2003 | Seki et al. | |
| 6,768,531 B2 * | 7/2004 | Ochiai et al. .................. | 349/141 |
| 6,914,640 B2 | 7/2005 | Yu | |
| 6,972,750 B2 | 12/2005 | Yu | |
| 7,084,933 B2 | 8/2006 | Oh et al. | |
| 7,123,216 B1 * | 10/2006 | Miles ............................. | 345/54 |
| 7,259,804 B2 | 8/2007 | Yu et al. | |
| 7,557,869 B2 * | 7/2009 | Bang et al. ...................... | 349/12 |
| 7,897,304 B2 * | 3/2011 | Moriya ........................... | 430/7 |
| 8,054,297 B2 * | 11/2011 | Huang ........................... | 345/173 |
| 2005/0140288 A1 * | 6/2005 | Suzuki .......................... | 313/506 |
| 2008/0002113 A1 * | 1/2008 | Abe et al. ...................... | 349/107 |
| 2009/0174681 A1 * | 7/2009 | Chang et al. .................. | 345/173 |

FOREIGN PATENT DOCUMENTS

| | | |
|---|---|---|
| CN | 101097346 A | 1/2008 |
| JP | 2008-32756 A | 2/2008 |
| TW | 200424687 A | 11/2004 |

* cited by examiner

*Primary Examiner* — Joseph Feild
*Assistant Examiner* — Linh N Hoffner
(74) *Attorney, Agent, or Firm* — Muncy, Geissler, Olds & Lowe, PLLC

(57) ABSTRACT

A color filter includes a transparent substrate, a conductive layer, a color filtering layer, and a protection layer. The conductive layer is formed on the transparent substrate for sensing touch signals, and the periphery of the conductive layer is provided with peripheral electrodes. The color filtering layer is formed on the conductive layer and includes multiple red light filtering sections, multiple green light filtering sections, and multiple blue light filtering sections, and a pixel of a liquid crystal display device includes at least one red light filtering section, at least one green light filtering section and at least one blue light filtering section. The protection layer is formed on the color filtering layer.

8 Claims, 9 Drawing Sheets

COLOR FILTER WITH TOUCH SCREEN FUNCTION AND LIQUID CRYSTAL DISPLAY DEVICE

CROSS REFERENCE TO RELATED APPLICATION

This application claims priority of application No. 097106728 filed in Taiwan R.O.C on Feb. 27, 2008 under 35 U.S.C. §119; the entire contents of which are hereby incorporated by reference.

BACKGROUND OF THE INVENTION

1. Field of the Invention

The invention relates to a color filter with a touch screen function and a liquid crystal display device having the color filter.

2. Description of the Related Art

FIG. 1 shows a schematic diagram of a conventional liquid crystal display device 100 with a touch activated control. Referring to FIG. 1, the liquid crystal display device 100 includes a touch panel 102 and a liquid crystal panel 104. The touch panel 102 is attached to the liquid crystal panel 104 by a double-sided adhesive tape 106. However, such assembly may have considerably large empty spaces between the touch panel 102 and the liquid crystal panel 104 to produce light leakage and reduce light transmittance as a result. Hence, in another liquid crystal display device 200 shown in FIG. 2, an entire plane of a touch panel 202 and an entire plane of a liquid crystal panel 204 are bonded with each other by optical cement 206 to avoid light leakage. However, the adhering of the optical cement 206 has inferior reliability and is liable to produce bubbles. Further, the constituting members of above design shown in FIG. 1 or FIG. 2 are too many and thus their assembly is difficult to be miniaturized.

BRIEF SUMMARY OF THE INVENTION

The invention relates to a color filter with a touch screen function and a liquid crystal display device having the color filter that are allowed to overcome the disadvantages of conventional designs.

According to an embodiment of the invention, a color filter with a touch screen function includes a transparent substrate, a conductive layer, a color filtering layer, and a protection layer. The conductive layer is formed on the transparent substrate for sensing touch signals, and the periphery of the conductive layer is provided with peripheral electrodes. The color filtering layer is formed on the conductive layer and includes multiple red light filtering sections, multiple green light filtering sections, and multiple blue light filtering sections, and a pixel of a liquid crystal display device includes at least one red light filtering section, at least one green light filtering section and at least one blue light filtering section. The protection layer is formed on the color filtering layer.

According to another embodiment of the invention, a liquid crystal display device with a touch activated control includes a color filter substrate, an active matrix substrate and a liquid crystal layer. The color filter substrate includes a first transparent substrate; a first transflective conductive layer formed on the first transparent substrate for sensing touch signals, the periphery of the first transflective conductive layer being provided with peripheral electrodes; a spacer layer formed on the first transflective conductive layer and comprising multiple first regions, second regions, and third regions that are distinguished from one another according to their respective thicknesses, wherein each first region, each second region and each third region overlap a red pixel portion, a green pixel portion and a blue pixel portion of a pixel, respectively; a second transflective conductive layer formed on the spacer layer; a flattened insulating layer formed on the second transflective conductive layer; and a common electrode formed on the flattened insulating layer. The active matrix substrate includes a second transparent substrate and multiple active devices and multiple pixel electrodes formed on the second transparent substrate. The liquid crystal layer is interposed between the color filter substrate and the active matrix substrate.

Through the above embodiments, since the first transflective conductive layer of the color filter also serves as a conductive layer for sensing touch signals, the color filter may have both functions of filtering incoming light and exercising a touch activated control. Hence, when the color filter is integrated into the liquid crystal display device, the double-sided adhesive tape or optical cement are no longer needed to avoid light leakage and improve light transmittance and assembling reliability. Further, the constituting members are reduced to facilitate miniaturization and the fabrication processes are also simplified; for example, compared with the conventional design, the two transparent substrates that in contact with each other and respectively belong to a touch panel and a liquid crystal panel are omitted from the above embodiments.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
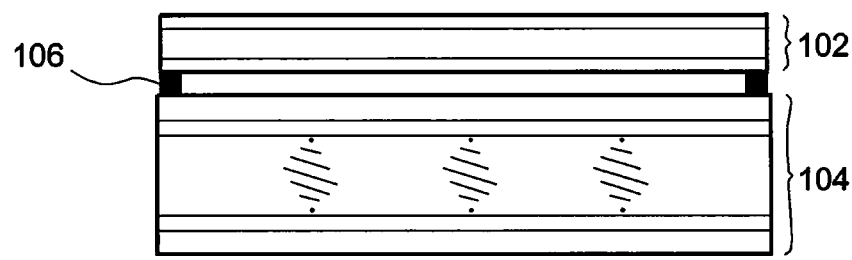
FIG. 1 shows a schematic diagram of a conventional liquid crystal display device with a touch activated control.
Figure 2:
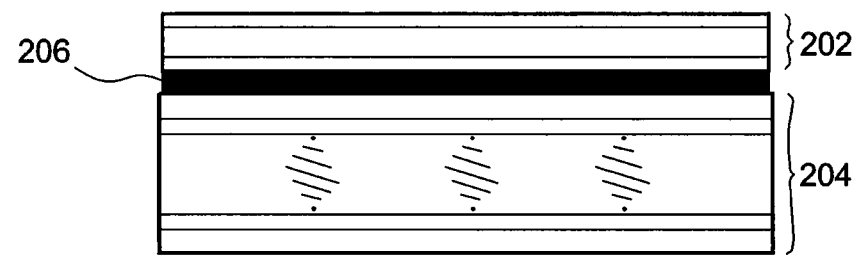
FIG. 2 shows a schematic diagram of another conventional liquid crystal display device with a touch activated control.
Figure 3:
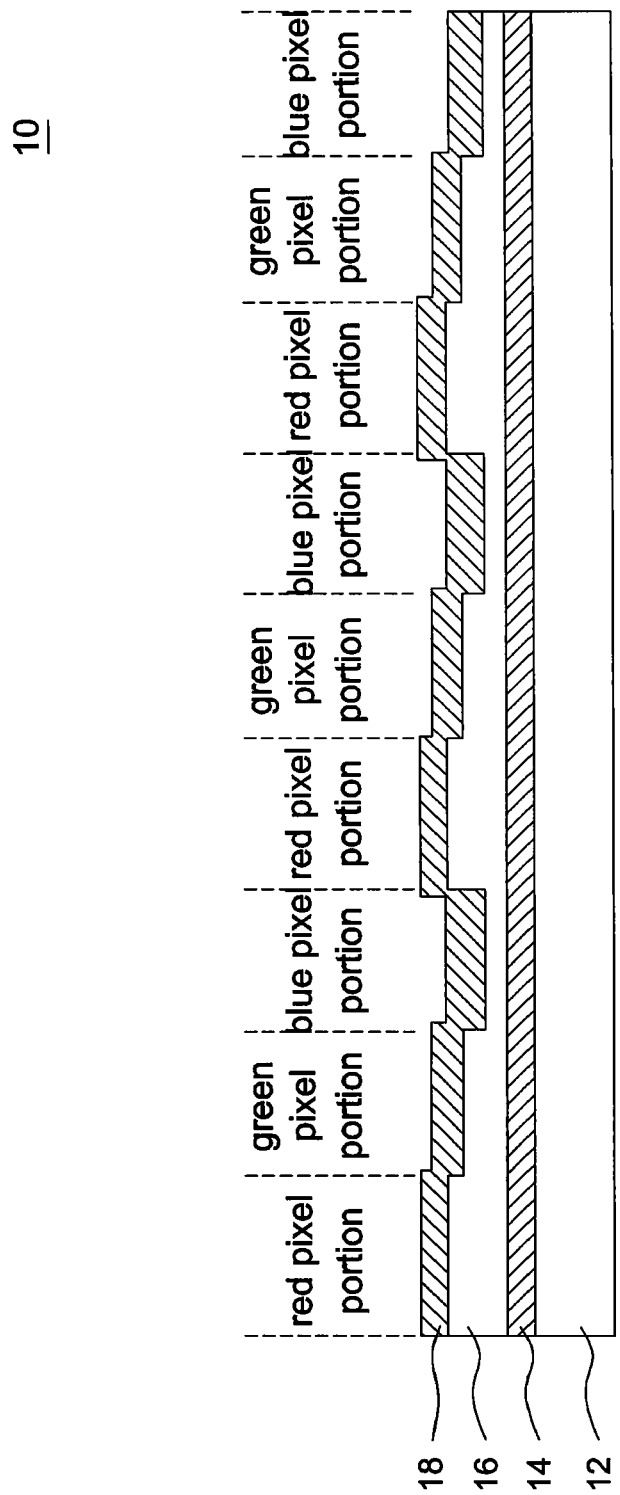
FIG. 3 shows a schematic diagram illustrating a color filter with a touch screen function according to an embodiment of the invention.

FIG. 3 shows a schematic diagram illustrating a color filter 10 with a touch screen function according to an embodiment of the invention. Referring to FIG. 3, a first transflective conductive layer 14, a spacer layer 16, and a second transflective conductive layer 18 are deposited on a transparent substrate 12 in succession. The first and the second transflective conductive layers 14 and 18 and the spacer layer 16 are provided through a variety of vacuum deposition processes such as thin film evaporation or sputtering. The transparent substrate 12 may be a glass substrate, a plastic sheet, or a plastic film.

Figure 4:
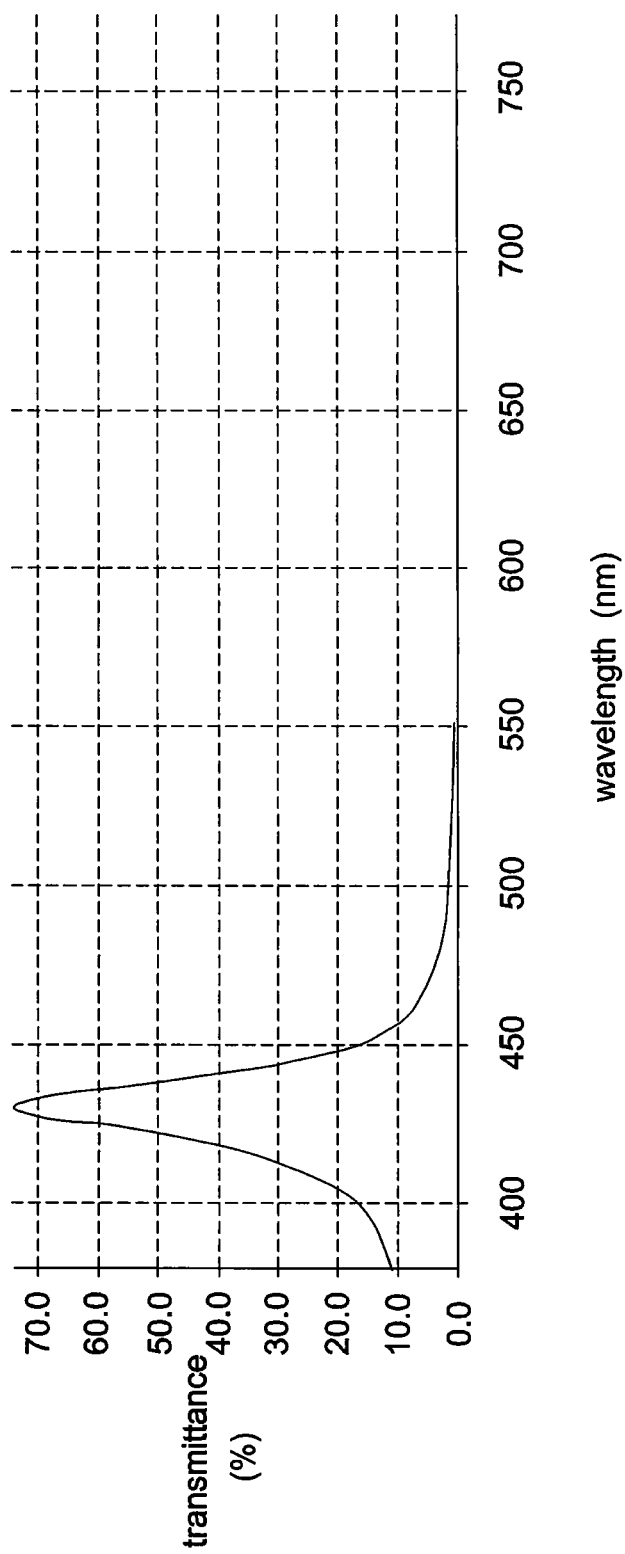
FIGS. 4-6 show spectrum diagrams illustrating different color light transmissions filtered out by a color filter.
Figure 5:
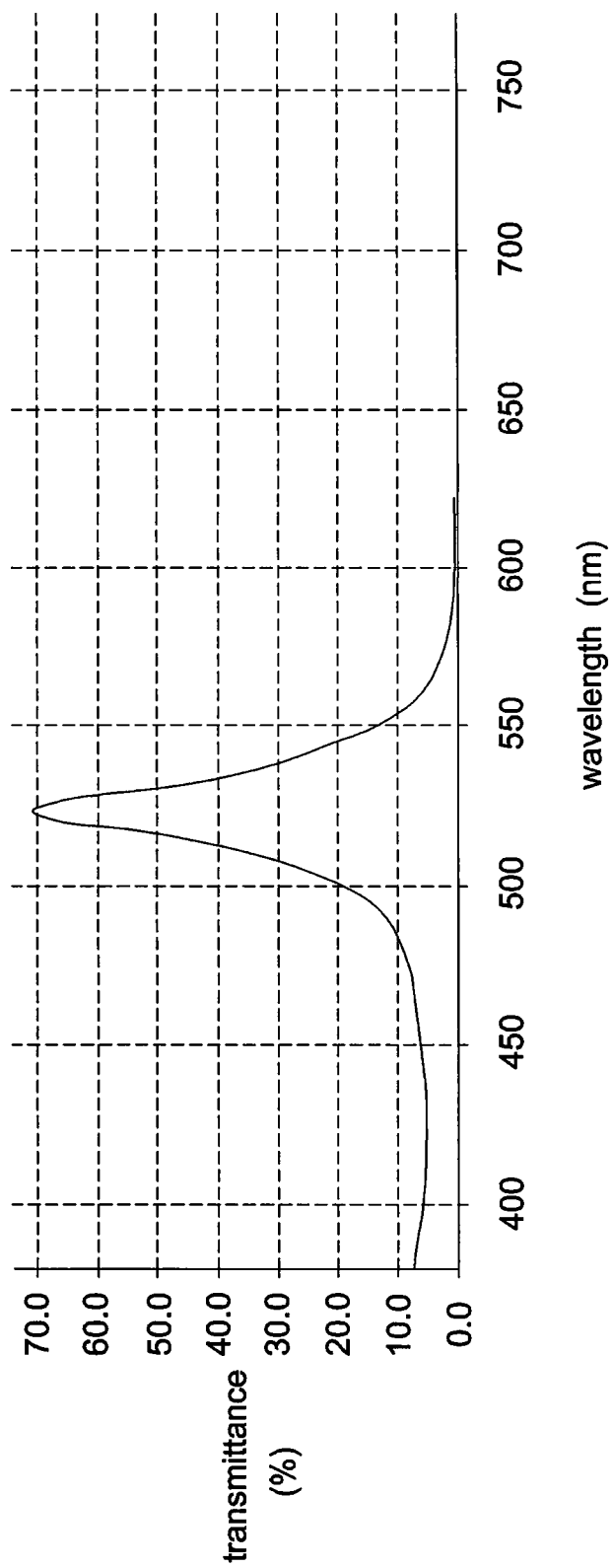
Figure 6:
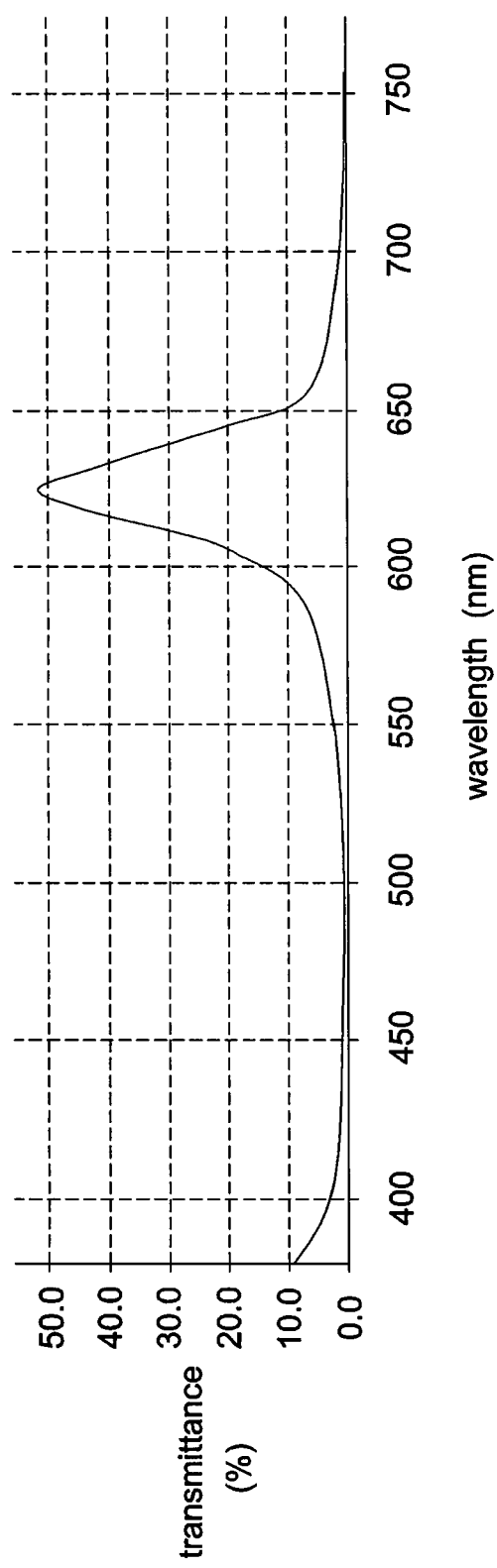

According to the embodiment, the two transflective conductive layers 14 and 18 with a thickness-tunable spacer layer 16 interposed between them constitute multiple single-cavity Fabry-Perot filters. In a Fabry-Perot filter, resonance peaks with high resolution occur when the thickness of the spacer layer is an integer multiple of one half the wavelength of resonant frequency. Thus the thickness of the spacer layer 16 determines the output center wavelength of the single cavity Fabry-Perot filter. Hence, in this embodiment, the spacer layer 16 includes a plurality of first regions, second regions, and third regions that are distinguished from one another according to their respective thicknesses to provide red, green, and blue light transmissions, and the first, the second and the third regions overlap a red, a green, and a blue pixel portions of a pixel, respectively. The transflective conductive layers 14 and 18 are preferably made of silver or silver alloy. The spacer layer 20 may be made of dielectric films or conductive metal-oxide films. The dielectric films may be composed of $MgF_2$, $SiO_2$, $Si_3N_4$, $Al_2O_3$, $TiO_2$, $ZrO_2$, or $Nb_2O_5$. The conductive metal-oxide films may be composed of indium tin oxide (ITO), indium zinc oxide (IZO), or aluminum zinc oxide (AZO). For example, when the transflective conductive layers 14 and 18 are made of silver and the spacer layer 16 is made of $Si_3N_4$, the color filter 10 is allowed to transmit a blue spectrum (FIG. 4), a green spectrum (FIG. 5), and a red spectrum (FIG. 6).

Figure 7:
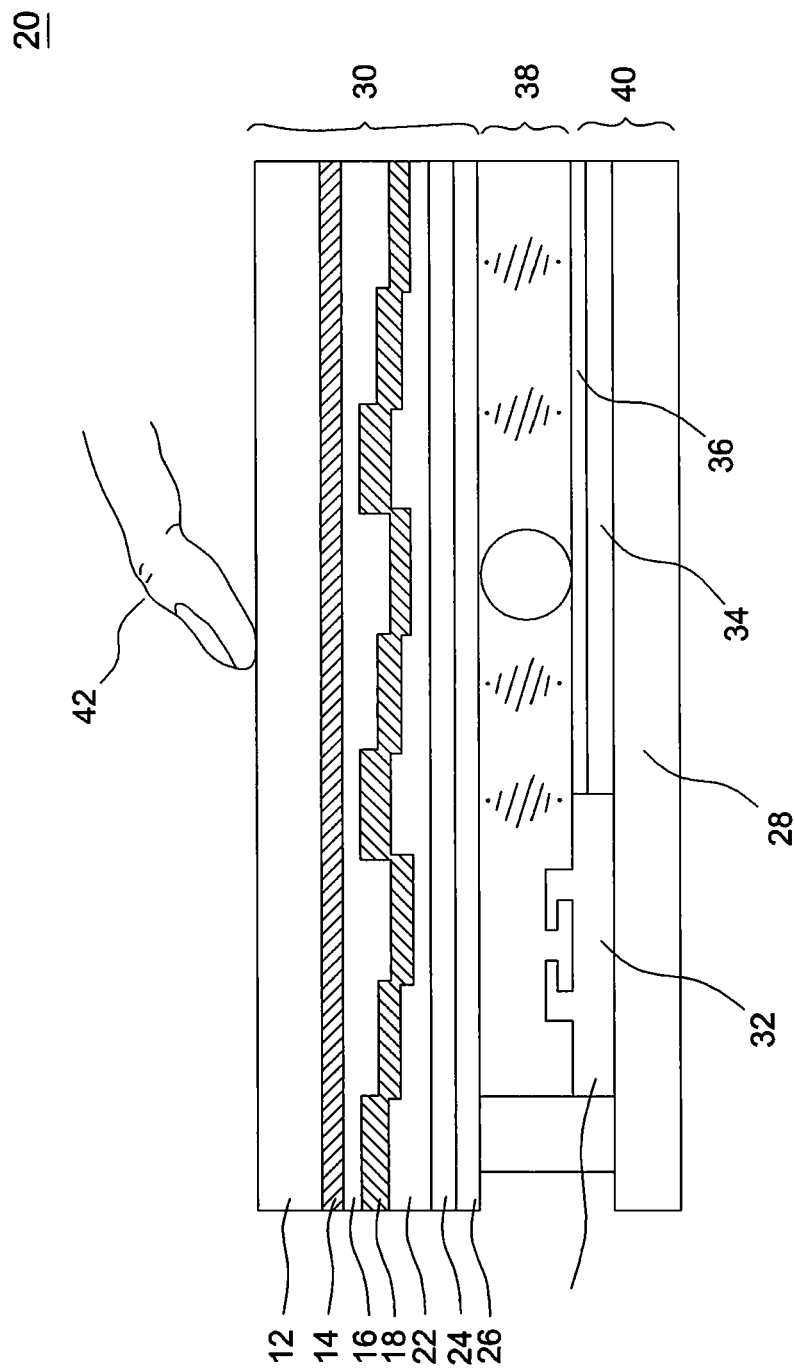
FIG. 7 shows a schematic diagram illustrating a liquid crystal display device with a touch activated control according to another embodiment of the invention.
Figure 8:
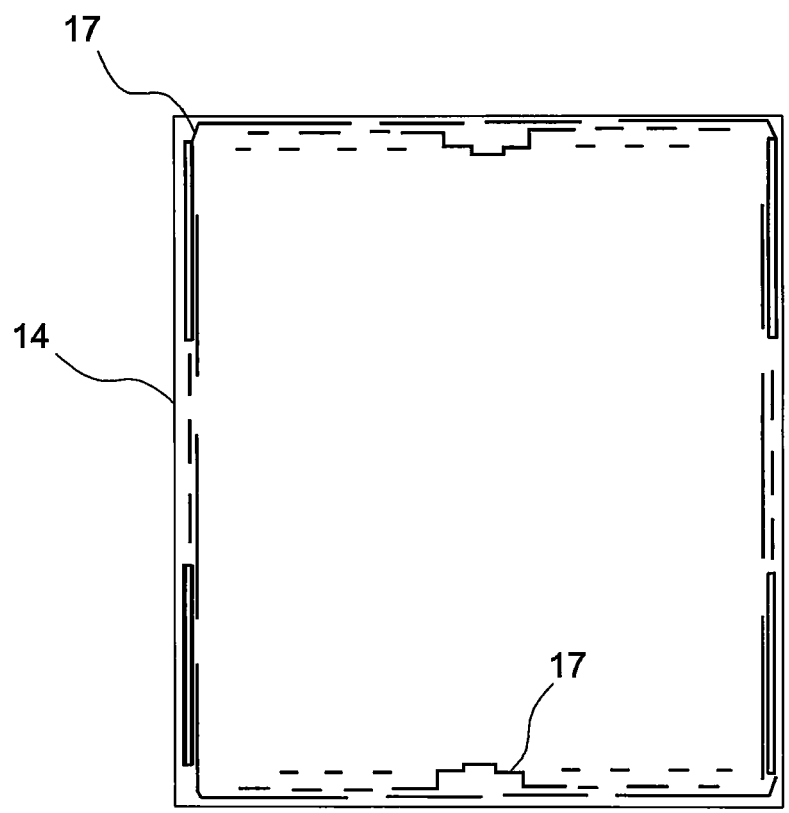
FIG. 8 shows a schematic diagram illustrating peripheral electrodes according to an embodiment of the invention.
Figure 9A:
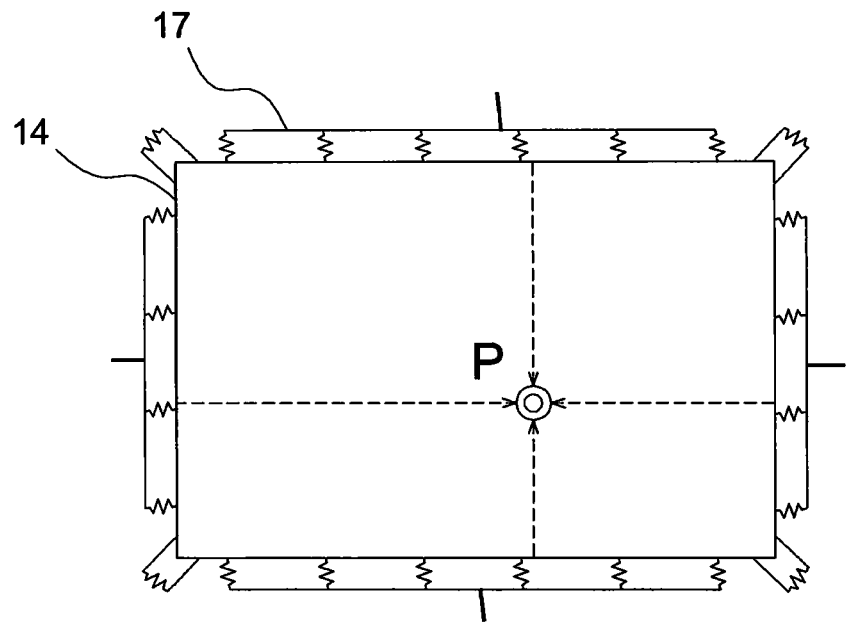
FIGS. 9A and 9B show schematic diagrams illustrating two different ways of detecting a touch point.
Figure 9B:
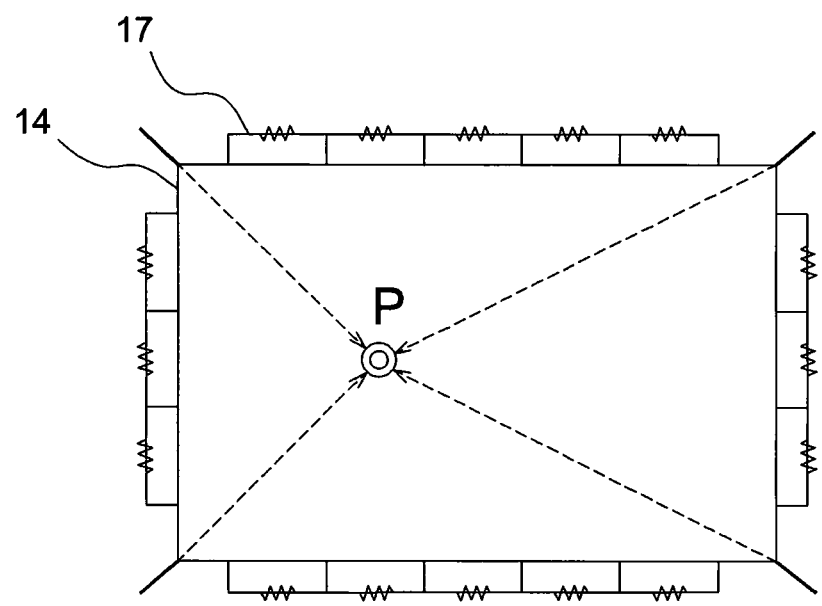

FIG. 7 shows a schematic diagram illustrating a liquid crystal display device 20 with a touch activated control according to another embodiment of the invention. Referring to FIG. 7, the liquid crystal display device 20 includes a color filter substrate 30, an active matrix substrate 40, and a liquid crystal layer 38 interposed between them. In the color filter substrate 30, the first transflective conductive layer 14 shown in FIG. 7 is capable of sensing touch signals, and the second transflective conductive layer 18 is a shielding layer. A flattened insulating layer 22 covers the second transflective conductive layer 18, a common electrode 24 is formed on an entire surface of the flattened insulating layer 22, and an alignment layer 26 is formed on the common electrode 24. In the active matrix substrate 40, multiple switching devices 32 such as TFTs, multiple pixel electrodes 34, and an alignment layer 36 are formed on a transparent substrate 28. Further, as shown in FIG. 8, peripheral electrodes 17 are formed on the periphery of the transflective conductive layer 14, and the peripheral electrodes 17 are arranged in specific patterns repeatedly along each side of the transflective conductive layer 14. When a finger 42 (shown in FIG. 7) does not touch the transparent substrate 12 on the transflective conductive layer 14, all peripheral electrodes 17 are equipotential and thus no current flows through the transflective conductive layer 14. In comparison, when the finger 42 touches the transparent substrate 12, the static electricity in a human body flows down to the ground to generate a tiny current. The variation of the tiny current is sensed by a controller (not shown) to calculate the location of a touch point of the finger 42, and the liquid crystal display device 20 responds the touch of the finger 42. The location of a touch point is detected by measuring the currents that are input from four corners or four sides of the peripheral electrodes 17. In FIGS. 9A and 9B, a symbol "P" denotes a touch point. In case the currents are input from four sides of the peripheral electrodes 17 as shown in FIG. 9A, the resistances in four corners are set as smaller than the resistances in four sides to obtain an equipotential electrical field, and the location of a touch point P is detected by measuring a top/down or a left/right ratio of currents. In case the currents are input from four corners of the peripheral electrodes 17 as shown in FIG. 9B, the location of a touch point P is detected according to a basis where a distance between the touch point P and each corner is in proportion to the current flowing through neighboring peripheral electrodes.

According to the above embodiments, since the first transflective conductive layer 14 of the color filter 10 also serves as a conductive layer for sensing touch signals, the color filter 10 may have both functions of filtering incoming light and exercising a touch activated control. Hence, when the color filter 10 is integrated into the liquid crystal display device 20, the double-sided adhesive tape 106 or optical cement 206 are no longer needed to avoid light leakage and improve light transmittance and assembling reliability. Further, the constituting members are reduced to facilitate miniaturization and the fabrication processes are also simplified; for example, compared with the conventional design, the two transparent substrates that in contact with each other and respectively belong to a touch panel and a liquid crystal panel are omitted from the above embodiments.

Figure 10:
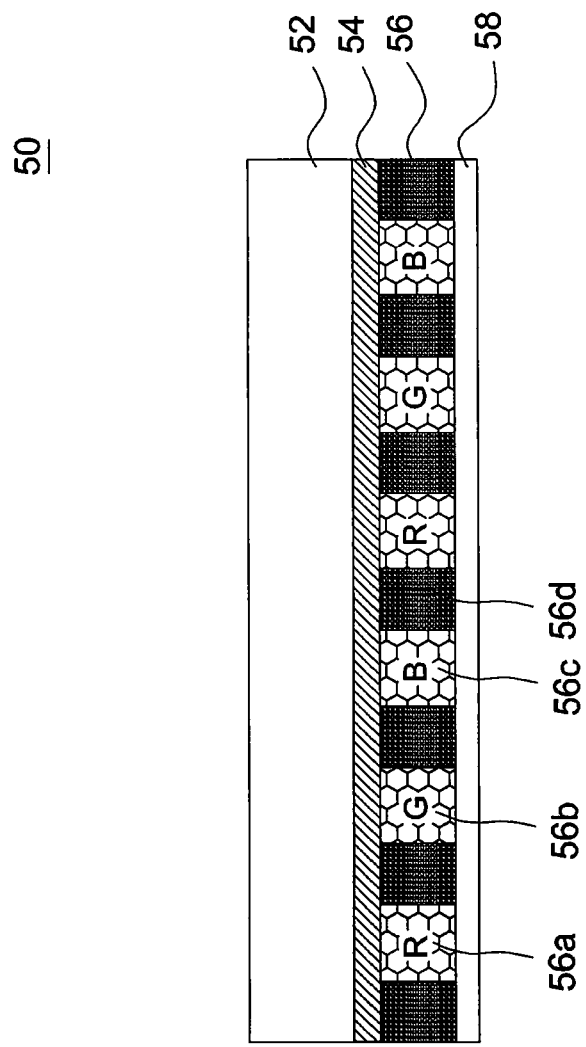
FIG. 10 shows a schematic diagram illustrating a color filter with a touch screen function according to another embodiment of the invention.

FIG. 10 shows a schematic diagram illustrating a color filter 50 with a touch screen function according to another embodiment of the invention. Referring to FIG. 10, a conductive layer 54 for sensing touch signals, a color filtering layer 56, and an overcoat layer 58 are formed on a transparent substrate 52 in succession. The color filtering layer 56 includes a red light filtering section 56a, a green light filtering section 56b and a blue light filtering section 56c, and a black matrix 56d is provided between two filtering sections for blocking light. Each filtering section is dyed a specific color by an organic pigment. Since a transmissive or transflective conductive layer is directly formed on the color filtering layer and serves to sense touch signals, the color filter 50 is allowed to filter incoming light and exercise a touch activated control similar to afore-mentioned embodiments. Similarly, in this embodiment, the transparent substrate 52 may be a glass substrate, a plastic sheet, or a plastic film.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display device with a touch activated control, comprising:
   a color filter substrate, comprising:
   a first transparent substrate;
   a first transflective conductive layer formed on the first transparent substrate for sensing touch signals, the periphery of the first transflective conductive layer being provided with peripheral electrodes;
   a spacer layer formed on and in direct contact with the first transflective conductive layer and comprising multiple first regions, second regions, and third regions that are distinguished from one another according to their respective thicknesses, wherein each first region, each second region and each third region overlap a red pixel portion, a green pixel portion and a blue pixel portion of a pixel, respectively;
   a second transflective conductive layer formed on the spacer layer;
   a flattened insulating layer formed on the second transflective conductive layer; and
   a common electrode formed on the flattened insulating layer; and
   an active matrix substrate, comprising:
   a second transparent substrate;
   multiple active devices and multiple pixel electrodes formed on the second transparent substrate; and
   a liquid crystal layer interposed between the color filter substrate and the active matrix substrate.

2. The liquid crystal display device as claimed in claim 1, wherein the second transflective conductive layer is a shielding layer.

3. The liquid crystal display device as claimed in claim 1, wherein the first and the second transflective conductive layers are made of silver or silver alloy.

4. The liquid crystal display device as claimed in claim 1, wherein the spacer layer is made of dielectric films.

5. The liquid crystal display device as claimed in claim 4, wherein the dielectric films are selected from the group consisting of $MgF_2$, $SiO_2$, $Si_3N_4$, $Al_2O_3$, $TiO_2$, $ZrO_2$, or $Nb_2O_5$.

6. The liquid crystal display device as claimed in claim 1, wherein the spacer layer is made conductive metal-oxide films.

7. The color filter as claimed in claim 6, wherein the conductive metal-oxide films are composed of indium tin oxide (ITO), indium zinc oxide (IZO), or aluminum zinc oxide (AZO).

8. The liquid crystal display device as claimed in claim 1, wherein the first transflective conductive layer, the spacer layer, and the second transflective conductive layer are arranged to form a plurality of single cavity Fabry-Perot filters.

\* \* \* \* \*